UNITED STATES PATENT OFFICE.

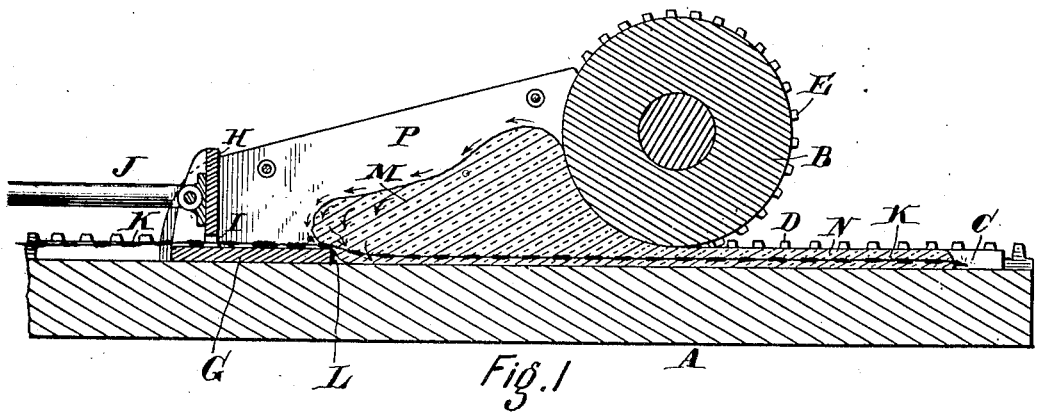

FRANK SHUMAN, OF PHILADELPHIA, PENNSYLVANIA, ASSIGNOR TO THE CONTINUOUS GLASS PRESS COMPANY, OF PHILADELPHIA, PENNSYLVANIA, A CORPORATION OF NEW JERSEY.

METHOD FOR THE MANUFACTURE OF WIRE-GLASS.

No. 875,857.     Specification of Letters Patent.     Patented Jan. 7, 1908.

Application filed June 14, 1902. Serial No. 111,748.

*To all whom it may concern:*

Be it known that I, FRANK SHUMAN, of the city and county of Philadelphia, State of Pennsylvania, have invented an Improvement in Methods for the Manufacture of Wire-Glass, of which the following is a specification.

My invention has reference to an improved method for the manufacture of wire glass and consists of certain improvements which are fully set forth in the following specification and shown in the accompanying drawings which form a part thereof.

The object of my invention is to provide a method or process which shall positively cause the meshed wire to be fed into the molten glass in such manner that the glass shall properly inclose it on top and bottom with the result of its definite location between the two surfaces so as to make a perfect article, namely, one in which the meshed wire is all covered and uniformly positioned within the glass sheet.

More specifically, my improved process consists in rolling a mass of glass upon a table, during this process introducing a meshed wire layer under the forward part of the ball of glass and supporting it temporarily in an advancing manner clear of the table but unobstructed from below, and causing the molten glass to flow by gravity through the mesh and below the wire prior to being rolled.

My invention consists further in advancing the point of support of the meshed wire more slowly than the advance of the rolling action to compensate for the gradual consumption of the glass and its less extension in advance of the point of rolling pressure.

As a suitable means for carrying out my invention, I provide a smooth table and roll for rolling the glass into a sheet and combine therewith an adjustable guide resting upon the surface of the table and over which the meshed wire layer is guided, the said guide being advanced commensurately with the speed of the advancing mass of molten glass. The meshed wire layer is thus supported slightly above the surface of the table so as to permit the molten glass to freely flow through the meshes to the under side and thus sustain the meshed wire layer clear of the surface of the table during the rolling operation. In this manner the meshed wire layer is incorporated into the glass sheet and may be located substantially equidistant from each surface, thereby producing a more perfect article than has heretofore been customary.

My invention will be better understood by reference to the drawings, in which:

Figure 1 is a longitudinal sectional elevation of a wire glass making machine adapted for carrying my improved process into operation; and Fig. 2 is an end elevation of the said machine.

A is a metal table or bed plate and is made smooth on its upper surface.

B is the smooth metal roller and runs upon guide strips C C resting upon the table A. The shaft of this roller is also provided with gears E which mesh with racks on the sides of the table for positively feeding the roller during its rotation. A hand wheel F may be employed to rotate the roller B and cause it to be fed forward under the control of the gears E and racks D. The strips C regulate the space between the roller B and the table A and hence the thickness of the glass plate.

P is a shoe resting upon the table and moved forward by the roller and consists of two side plates connected by rods. The function of the shoe is to confine the body of glass against lateral spreading beyond the desired width.

Resting upon the surface of the table A is a flat plate G which extends laterally to the side plates of the shoe P. This plate G approximately is of a thickness equal to the thickness of the glass to be rolled but its thickness may be varied as desired. It is provided with an upright flange H which is slotted adjacent to the plate G at I for the full width to be occupied by the meshed wire layer K and through which slot said wire layer is fed as clearly indicated in the drawings. The guide G H for the meshed wire may be fed forward in any suitable manner, a hand rod J for this purpose being shown. While the guide G H may be moved forward at approximately the same speed as the travel of the roller, it is not desirable that it should move quite so rapidly because it is preferable that the molten glass M shall extend from the roller B forward to or very slightly if at all over the rear end of the plate G as shown. Under these conditions the glass will be allowed to flow through the meshes formed by the wire so as to fill the space L beyond the end of the plate G and beneath the wire and as the roller and guide plate G are moved forward the meshed wire layer will float upon the glass which has thus passed below it and be covered by the rest of the mass until it is rolled forward, as will be readily understood by those familiar with the art. The thickness of the glass between the wire and table will be dependent upon the thickness of the guide plate G and the thickness of the strips C C which regulate the actual thickness of the finished sheet of glass.

If the thickness of the plate G is excessive relatively to the thickness of the strips C, the wire will tend to lie nearer the top surface of the finished glass and vice versa. The upright or flange H acts as a guide through its slot to insure the meshed wire layer being held down to the surface of the plate G.

The particular shape of the guide G H may be varied so long as it performs the functions herein set out namely, sustain the wire mesh at a definite distance above the table against the forward portion of the molten glass and guide the wire under said glass so as to temporarily hold it clear of the table and allow the glass to flow through its meshes. In the operation of the apparatus it is not necessary that the wire shall touch the table surface except perhaps at the beginning and ending of the operation of making the complete sheet of wire glass.

I have shown an apparatus such as is excellently adapted for carrying into effect my improved method, but the details of the apparatus may be varied as may be found expedient for the more perfect operation of my invention.

Having now described my invention what I claim as new and desire to secure by Letters Patent, is:

1. The herein described process for making glass consisting in rolling down a mass of glass into a sheet and during this operation feeding directly into the forward part of the mass of glass near its bottom a meshed wire layer, positively supporting the meshed wire layer in a substantially horizontal plane slightly above the bottom of the sheet of glass and immediately adjacent to the front of the mass of glass so that as the molten glass is moved forward it may flow to the under side through the meshes without depressing the meshed wire and directly into position to form the under side of the sheet of glass, and advancing the place of support of the meshed wire layer at a speed independent of the advancing speed of the rolling down device as the rolling operation proceeds, whereby the meshed wire is always supported immediately adjacent to the front portion of the molten glass.

2. The herein described process for making wire glass consisting in rolling down a mass of glass into a sheet and during the operation feeding into the forward part of the mass of glass near its bottom a meshed wire layer, supporting the meshed wire layer slightly above the support upon which the glass is rolled so that the molten glass may flow to the under side through the meshes, and advancing the place of support of the meshed wire layer as the rolling operation proceeds but at a gradually decreasing speed relatively to the speed of the rolling operation.

3. The herein described process for making a sheet of wire glass, which consists in placing a mass of molten glass upon the table, rolling the mass forward into a sheet, feeding into the mass of glass at its forward part a meshed wire layer during the rolling operation, supporting the meshed wire layer immediately adjacent to the molten glass and at the advancing place where it is being successively highly heated by the glass so that the molten glass may flow to the under side through the meshes and the meshed wire layer supported against sagging, and advancing the place of support by hand independently of the advance of the rolling means to maintain the place of support always adjacent to the glass irrespective of the variations of the distance of the front part of said glass from the rolling means.

In testimony of which invention, I have hereunto set my hand.

FRANK SHUMAN.

Witnesses:
R. M. HUNTER,
R. M. KELLY.